United States Patent
Lee et al.

(10) Patent No.: US 7,996,772 B2
(45) Date of Patent: Aug. 9, 2011

(54) APPARATUS, METHOD, AND MEDIUM FOR PROVIDING GUIDELINE FOR ARRANGING IMAGES WITH STORY

(75) Inventors: Hye-jeong Lee, Seoul (KR); Min-kyu Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1009 days.

(21) Appl. No.: 11/822,569

(22) Filed: Jul. 6, 2007

(65) Prior Publication Data

US 2008/0126942 A1    May 29, 2008

(30) Foreign Application Priority Data

Jul. 6, 2006  (KR) .................. 10-2006-0063600
Jan. 5, 2007  (KR) .................. 10-2007-0001601

(51) Int. Cl.
    G06F 15/00    (2006.01)
    G06F 13/00    (2006.01)

(52) U.S. Cl. ............... 715/730; 715/501.1; 715/763

(58) Field of Classification Search .............. 715/700, 715/713, 715, 742, 763–765, 501.1, 730, 715/851–855
See application file for complete search history.

(56) References Cited

U.S. PATENT DOCUMENTS

2004/0205515 A1* 10/2004 Socolow et al. ........... 715/501.1
2007/0016486 A1*  1/2007 Stone et al. ................ 705/26
2010/0013757 A1*  1/2010 Ogikubo ................... 345/156

FOREIGN PATENT DOCUMENTS

| JP | 2000-165786 | 6/2000 |
| JP | 2003-179844 | 6/2003 |
| KR | 10-2004-0097878 | 11/2004 |

* cited by examiner

Primary Examiner — Cao "Kevin" Nguyen
(74) Attorney, Agent, or Firm — Staas & Halsey LLP

(57) ABSTRACT

One or more embodiments relate to a method, apparatus, and medium for providing a guideline for arranging images with a story. An apparatus for providing a guideline for arranging images with a story according to an aspect of the present invention includes a guideline control module controlling a guideline selected by a user according to a user's input or a content acquisition situation, an apparatus adaptive module automatically setting a state of an apparatus according to the guideline selected by the user, and a context processing module acquiring contents relative to the guideline.

31 Claims, 13 Drawing Sheets

FIG. 4

| BUDDHIST TEMPLE TRAVEL | STORY ITEM | FORMAT | NUMBER |
|---|---|---|---|
| | STORY OPENING | VOICE | - |
| | PHOTOGRAPH ENTRANCE OF BUDDHIST TEMPLE | IMAGE | 1 |
| | PHOTOGRAPH PERIPHERAL SCENE VIEWED FROM ENTRANCE OF BUDDHIST TEMPLE | IMAGE | 2 |
| 401a | PHOTOGRAPH FRONT OF MAIN TEMPLE | IMAGE | - |
| | PHOTOGRAPH PRECINCT OF SHRINE IN FRONT OF MAIN TEMPLE | MOTION PICTURE | - |

Columns: 401, 402, 403

FIG. 5

CAPTURING INSTRUCTION

1. DISPOSE MULTIMEDIA APPARATUS HORIZONTALLY
2. PHOTOGRAPH MAIN TEMPLE AT ANGLE OF 30 DEGREES SUCH THAT SIDE AND FRONT OF MAIN TEMPLE IS VIEWED
3. PHOTOGRAPH MAIN TEMPLE AT ONE SIDE OF MAIN TEMPLE WHEN CAPTURING PORTRAIT IN FRONT OF MAIN TEMPLE
4. . . .

APPARATUS, METHOD, AND MEDIUM FOR PROVIDING GUIDELINE FOR ARRANGING IMAGES WITH STORY

CROSS-REFERENCE TO RELATED APPLICATIONS

This application claims priority benefit from Korean Patent Application No. 10-2006-0063600 filed on Jul. 6, 2006 in the Korean Intellectual Property Office and from Korean Patent Application No. 10-2007-0001601 filed on Jan. 5, 2007 in the Korean Intellectual Property Office, the disclosures of which are incorporated herein by reference in their entirety.

BACKGROUND

1. Field

Embodiments discussed herein relate to an apparatus, method, and medium for providing a guideline for arranging images with a story. More particularly, embodiments discussed herein relate to an apparatus, method, and medium for providing a guideline for arranging images with a story that are capable of providing a guideline based on knowledge of a specialist or a user when a multimedia apparatus is used and for controlling a state of the multimedia apparatus according to a guideline selected by the user, thereby enabling the public to constitute an image having a specialist story line or enabling the user to edit or to create the guideline.

2. Description of the Related Art

In recent years, there has been a trend to acquire contents on events, such as a birthday party, a wedding ceremony, a graduation ceremony or a travel, and manufacture (create) a photo album of a form of multimedia contents like motion pictures, images, and voices based on the contents.

A special photographer may be employed in a special event like the first birthday of a baby or a wedding ceremony and manufacture (create) an album. With the popularization of a digital camera, a digital camcorder, and a voice recorder (generally, MP3 player), a large amount of contents on a specific event are acquired, and a desire for manufacturing (creating) the acquired contents in a form of multimedia contents and storing and viewing them has increased.

Further, multimedia contents that are acquired by a mobile communication apparatus, such as a cellular phone, personal digital assistants, portable media players, etc., are increasingly transmitted through a multimedia message server (MMS).

However, when acquiring contents, general users acquire contents impromptu because there is a story line on a photo album to be subsequently created. Photo albums can be a slide show type where a plurality of contents having no story line are shown at a predetermined time interval.

According to this slide show type, if a predetermined time passes after predetermined contents are simply shown, subsequent contents are shown. Since contents are stopped for a predetermined time, the contents are statically represented, and it is not possible to construct contents according to a memory or preference of an individual person.

Further, since each of the contents is separately shown, it is difficult for the user to know association among a current content, a previous content, and a subsequent content, and various representations are impossible due to static representation.

That is, since a predetermined content is statically represented for a predetermined time, even when a plurality of contents has association therebetween, for example, the plurality of contents are photos captured at the same place, it is difficult to instinctively recognize association among contents.

Accordingly, in recent years, in order to break monotone in the slide show type, a guideline for an image to be captured is provided or various viewing effects, such as panning or tilt, are additionally provided when contents are viewed. However, this method does not provide a guideline having a story line according to a theme but a guideline for a scene to be captured.

Further, according to the method, since a guideline is only provided for a digital camera, a guideline is provided only for editing images. In addition, the personal contents lack diversity and thus it is difficult to satisfy professionalism and freshness.

SUMMARY

According to an aspect of embodiments, there is provided an apparatus, method, and medium for providing a guideline for arranging images with a story in which the public constructs an image and an album having a specialist story line.

According to another aspect of embodiments, there is provided an apparatus, method, and medium for providing a guideline for arranging images with a story that are capable of associating contents with one another and improving instinct, thereby enabling a user to conveniently manage contents.

According to yet another aspect of embodiments, there is provided an apparatus, method, and medium for providing a guideline for arranging images with a story in which a user manufactures (creates) a guideline according to an object and taste of the user and shares a guideline manufactured by another user, thereby applying various type of guidelines.

According to an aspect of embodiments, there is provided an apparatus for providing a guideline for arranging images with a story, the apparatus including a guideline control module to control guideline selected by a user according to a user's input or a content acquisition, an apparatus adaptive module to automatically set a state of the apparatus for providing the guideline according to the guideline selected by the user, and a context processing module to acquire contents associated with the selected guideline.

According to an aspect of embodiments, there is provided an apparatus for providing a guideline for arranging images with a story, the apparatus including a guideline selection input module providing guideline information and receiving a selection of a user, an instruction providing module providing an instruction to allow the user to easily understand the selected guideline, and a frame information proving module providing information including a frame to allow the user to easily understand the instruction.

According to an aspect of embodiments, there is provided an apparatus for providing a guideline for arranging images with a story, the apparatus including a mode switching module to switch modes of a multimedia apparatus according to situations of guideline selected by a user, and an attribute setting module to set an attribute of the multimedia apparatus according to the selected guideline and the switched mode.

According to an aspect of embodiments, there is provided an apparatus for providing a guideline for arranging images with a story, the apparatus including a content acquiring module to receive contents acquired by a user through guideline, a metadata extracting module to extract metadata from the contents, and a relation setting module to associate the contents with one another on the basis of the metadata.

According to an aspect of embodiments, there is provided an apparatus for providing a guideline for arranging images with a story, the apparatus including a managing module to store contents according to association between contents acquired by a user through guideline and metadata of the contents, and a content creating module to create a photo album having a form of a motion picture and contents having a form of a multimedia message on the basis of the contents and the metadata of the contents.

According to an aspect of embodiments, there is provided an apparatus for providing a guideline for arranging images with a story, the apparatus including a user edition/creation module to allow a user to edit or create one of guideline and a story template as a format for arranging contents, and a guideline transmitting/receiving module to transmit at least one of the edited or created guideline and story template to an external apparatus.

According to an aspect of embodiments, there is provided a method of providing a guideline for arranging images with a story, the method including controlling guideline selected by a user according to a user's input or a content acquisition, automatically setting a state of an apparatus for providing guideline according to the guideline selected by the user, and acquiring contents associated with the guideline.

According to an aspect of embodiments, there is provided a method of providing a guideline for arranging images with a story, the method including providing guideline information and receiving a selection of a guideline from a user, providing an instruction on the selected guideline, and providing information including a frame to allow the user to easily understand the instruction.

According to an aspect of embodiments, there is provided a method of providing a guideline for arranging images with a story, the method including switching modes of a multimedia apparatus according to situations of guideline selected by a user, and setting an attribute of the multimedia apparatus according to the selected guideline and the switched mode.

According to an aspect of embodiments, there is provided a method of providing a guideline for arranging images with a story, the method including receiving contents acquired by a user through guideline, extracting metadata from the contents, and associating the contents with one another on the basis of the metadata.

According to an aspect of embodiments, there is provided a method of providing a guideline for arranging images with a story, the method including storing contents according to association between contents acquired by a user through guideline and metadata of the contents, and creating a photo album having a form of a motion picture and contents having a form of a multimedia message on the basis of the contents and the metadata of the contents.

According to an aspect of embodiments, there is provided a method of providing a guideline for arranging images with a story, the method including allowing a user to edit or create one of guideline and a story template as a format for arranging contents, and transmitting at least one of the edited or created guideline and story template to an external storing place.

According to another aspect of embodiments, there is provided at least one computer readable medium storing computer readable instructions to implement methods of embodiments.

BRIEF DESCRIPTION OF THE DRAWINGS

These and/or other aspects, features, and advantages will become apparent and more readily appreciated from the following description of exemplary embodiments, taken in conjunction with the accompanying drawings of which:

FIG. 4 is a diagram illustrating a guideline according to an exemplary embodiment;

FIG. 5 is a diagram illustrating a capturing instruction according to an exemplary embodiment;

DETAILED DESCRIPTION OF EMBODIMENTS

Figure 1:
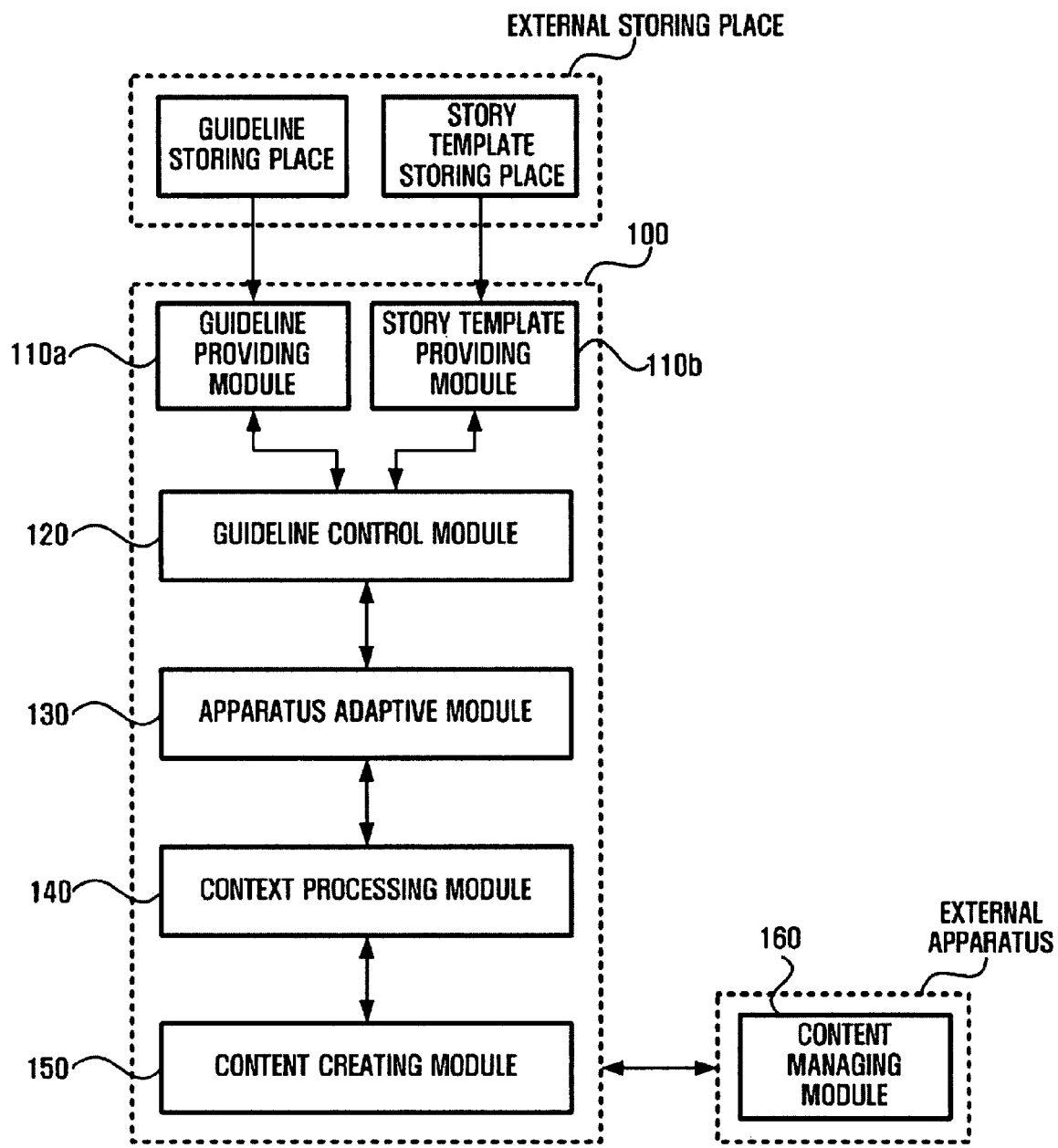
FIG. 1 is a block diagram illustrating a structure of an apparatus for providing a guideline for arranging images with a story according to an exemplary embodiment.

Reference will now be made in detail to exemplary embodiments, examples of which are illustrated in the accompanying drawings, wherein like reference numerals refer to the like elements throughout. Exemplary embodiments are described below by referring to the figures.

FIG. 1 is a diagram illustrating a structure of an apparatus that provides and applies a guide line for arranging images with a story according to an exemplary embodiment.

An apparatus 100 for providing and applying a specialist knowledge-based guideline includes a guideline providing module 110a, a story template providing module 110b, a guideline control module 120, an apparatus adaptive module 130, a context processing module 140, a content creating module 150, and a content managing module 160 of an external apparatus.

The guideline providing module 110a shown in FIG. 1 stores a guideline according to an event/theme based on knowledge of one or more specialists. In the guideline, things about scenes from which a user acquires contents (hereinafter, referred to as story item) are arranged in order.

Further, the guideline serves to make subsequently created images have stories, thereby improving quality and completeness of corresponding contents.

In this case, the 'image' denotes at least one of a motion picture, a still image, an image list composed of one or more images, a photo, and a photo album composed of one or more photos.

The story template providing module 110b stores a story template that is to be used in a subsequently created photo album, and the story template may be provided together with the guideline according to selection of the user.

In this case, a 'template' is a format for arranging contents of the above-described image. For example, a story template according to an exemplary embodiment is shown in FIG. 2.

Figure 2:
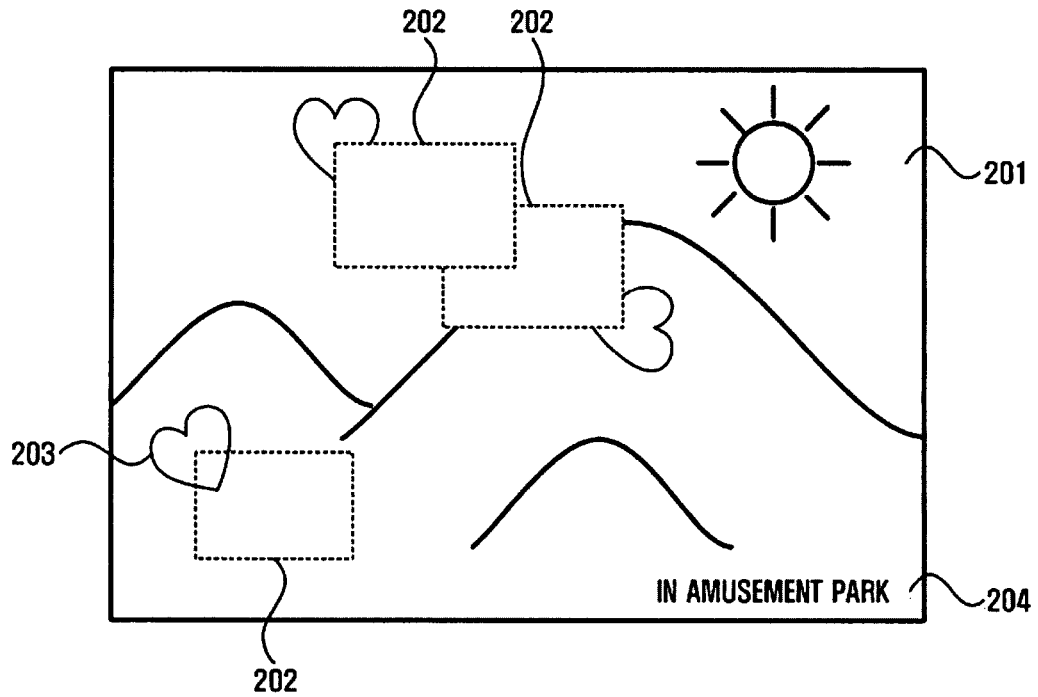
FIG. 2 is a diagram illustrating a story template according to an exemplary embodiment.

As shown in FIG. 2, a template may include a background screen 210, a layout 202 in which contents are arranged, a sticker 203 that decorates the background screen 201, a caption, and the like. However, exemplary embodiments are not limited thereto. The template further may include various elements, such as a background music that gives a sound effect while the contents are displayed, an intro that informs that the contents starts to be displayed, an ending that informs that display of the contents is completed, a transition in which the contents and effects related to the contents appear or disappear, an animation that changes locations and sizes of the contents at different speeds with the passage of time, a camerawork that is an effect in which a camera moves while the contents do not move, a timing that is time information on the contents, a control through which a user can perform various controls, and a feedback through the user makes comments on a plurality of content groups or respective contents fed back, thereby giving predetermined supplementary effects to the contents.

Further, for the respective elements, various candidates may be constructed, such that the respective constituent elements may be selected when the template is selected. Furthermore, terminologies for the template used in exemplary embodiments and a plurality of elements included in the template are only one example to make the present invention easily recognized, and may be changed, if necessary.

At this time, the guideline and the story template may be stored in an external storing place.

In recent years, as a multimedia apparatus is decreased in size, in order to save a memory of a multimedia apparatus, all of guidelines and story templates may be stored in the external storing place, and a guideline and a story template of a theme which a user wants may be selectively stored in the guideline providing module 110a and the story template providing module 110b of the multimedia apparatus.

If a storage space is sufficient in the multimedia apparatus, the guideline and the story template do not need to be stored in a separate external storing place.

Further, the content managing module 160 that manages the contents may be included in the multimedia apparatus or included in a separate external apparatus.

Figure 3:
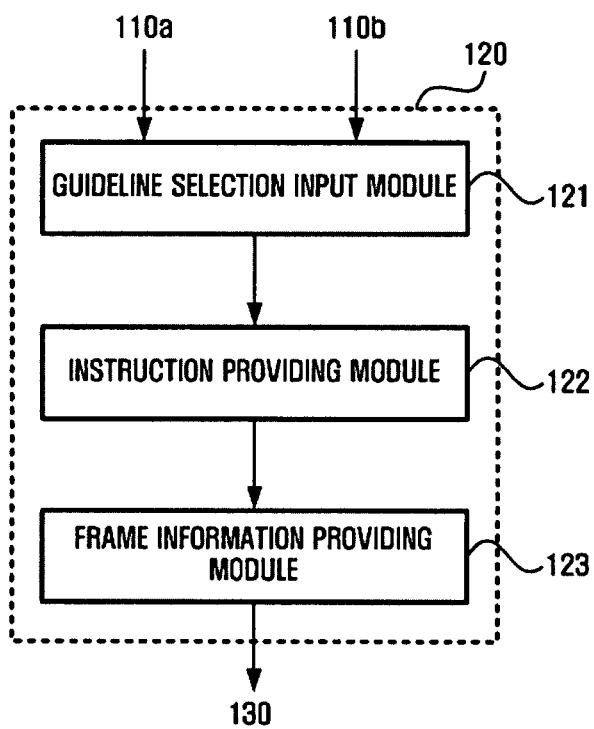
FIG. 3 is a block diagram illustrating a structure of a guideline control module in an apparatus shown in FIG. 1.

FIG. 3 is a block diagram illustrating a structure of a guideline control module 120 shown in an apparatus 100 shown in FIG. 1.

The guideline control module 120 includes a guideline selection input module 121 that provides guideline information and receives selection of a user, an instruction providing module 122 that provides an instruction on the selected guideline, and a frame information providing module 123 that provides information including frame such that the user can easily understood the instruction.

The guideline control module 120 adjusts the guideline selected by the user according to input of the user or a content acquisition situation.

To do so, the guideline selection input module 121 provides guideline information transmitted from the guideline providing module to the user using characters, voices, icons, and the like, such that the user can select the guideline information.

As described above, in the guideline, story items on scenes from which the user obtains contents are arranged.

A guideline according to an exemplary embodiment has a storyline and an order exists in the story items. However, the user may arbitrarily select the story item and acquire the contents of the corresponding story item.

However, according to types of themes/events, a temporal restriction may exist, as in a bride and bridegroom entrance scene in a wedding ceremony. In this case, a user interface (UI) is provided to inform a user that there is a temporal restriction.

The order of the guideline may be changed by the user, and the acquired contents are analyzed and proceed to a next operation.

Further, since a content medium format that can be acquired is different according to each multimedia apparatus, the guideline selection input module 121 provides a medium format of contents to be acquired from the corresponding scene together with story items of the guideline.

In this case, the multimedia apparatus is an apparatus by which the user acquires multimedia contents, and is a concept that includes all apparatuses, such as a digital camera, a camcorder, a miniket, a cellular phone, a personal computer (PC) including a video camera, which includes a microphone.

FIG. 4 is a diagram illustrating a guideline according to an exemplary embodiment.

For example, when a guideline is provided as a theme of a 'Buddhist temple travel', story items 401, medium formats 402 of contents to be acquired from the corresponding scenes, and the number 403 of contents acquired by the user are displayed in the guideline.

The story item 401 of the guideline includes a capturing instruction and a frame template.

In the guideline shown in FIG. 4, the user acquires contents according to the story items. When the user selects the story item of capturing the front of the main temple 401a, the instruction providing module 122 provides to the user, a capturing instruction stored in the guideline storage module 110a, as shown in FIG. 5, and when a mode of the multimedia apparatus is switched into an acquisition (capturing) mode, the frame information providing module 123 transparently shows the frame template corresponding to the capturing instruction provided from the guideline to the view finer of the multimedia apparatus.

Figure 6:
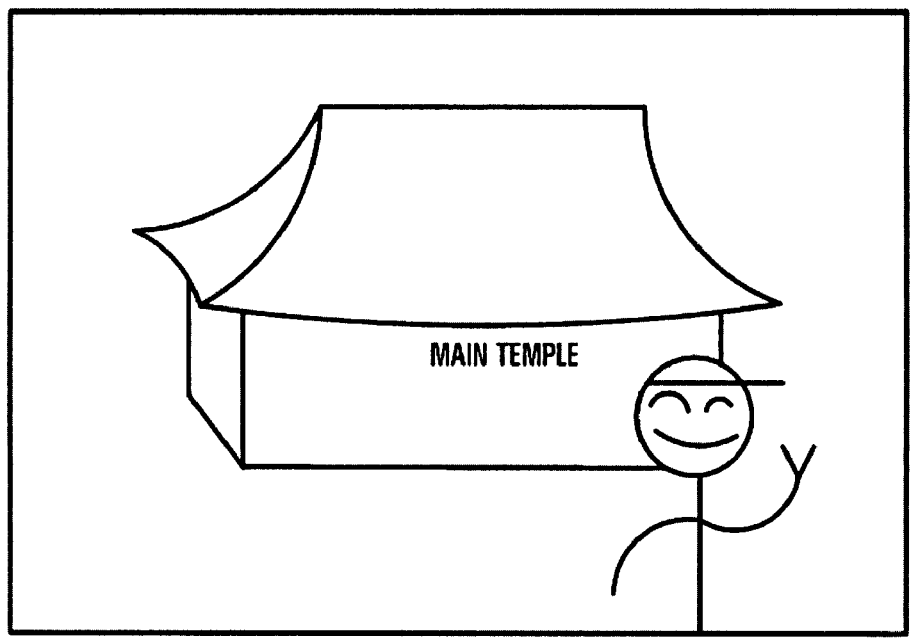
FIG. 6 is a diagram illustrating a frame template corresponding to a capturing instruction shown in FIG. 5.

FIG. 6 is a diagram illustrating a frame template corresponding to a capturing instruction shown in FIG. 5.

The frame information providing module 123 provides the frame template such that the user can easily understand the capturing instruction.

As described above, the frame template is transparently shown to the view finder, and transparency is preferable to be set to a degree which a target for the user to want to photograph can be easily recognized when the frame template overlaps the target in the view finder.

Further, suitability of the provided frame template and an actual object taken by the view finder may be calculated in real time and shown.

The frame information providing module 123 may provide not only the frame template to easily recognize the capturing instruction but also the image captured through the capturing instruction.

Figure 7:
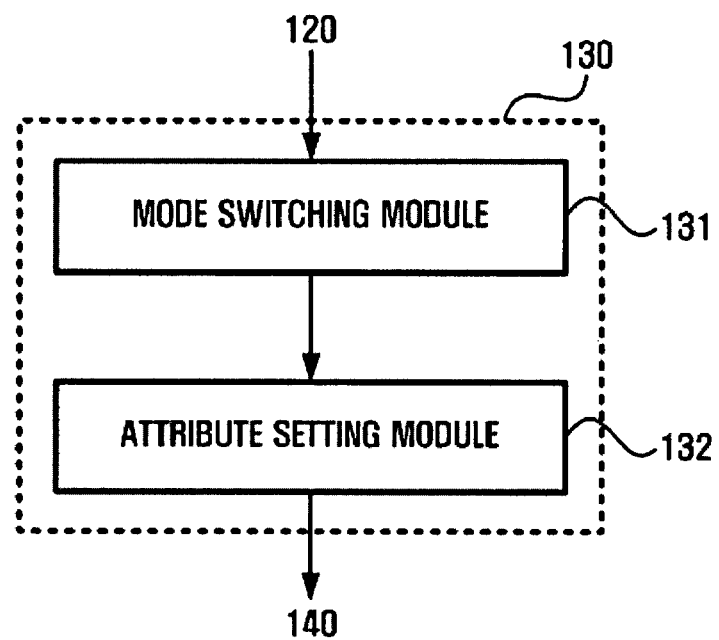
FIG. 7 is a block diagram illustrating a structure of an apparatus adaptive module in an apparatus shown in FIG. 1.

FIG. 7 is a block diagram illustrating a structure of an apparatus adaptive module 130 in an apparatus 100 shown in FIG. 1.

The apparatus adaptive module 130 includes a mode switching module 131 that switches a mode of the multimedia apparatus according to a situation of the guideline selected by the user, and an attribute setting module 132 that sets an attribute of the multimedia apparatus according to the selected guideline and the switched mode.

When the user wants to select the story item and acquires the contents according to the guideline, the mode switching module 131 automatically sets the multimedia apparatus according to the situation of the acquired contents (Content Capture Context).

For example, the mode switching module 131 automatically switches the mode into a motion picture mode when a story item for capturing a motion picture is set, and automatically switches the mode into a scene mode when a peripheral scene is acquired as an image.

The attribute setting module 132 sets the attribute of the multimedia apparatus according to the guideline and the mode switched by the above-described mode switching module 131.

For example, when the story item corresponds to capturing of a peripheral scene, the attribute setting module 132 turns down a volume of a microphone so as to prevent noise from permeating therein. When the peripheral scene is acquired as the image, the attribute setting module 132 causes the mode to be automatically switched into the scene mode, and when a bride is taken in a wedding ceremony, the attribute setting module 132 controls a balance and exposure such that the bride is beautifully seen.

In addition, the attribute setting module 132 turns down the volume of the microphone when narration is recorded, and turns down the volume of the microphone when a motion picture is taken in the crowd.

The general user is short in a special technology that acquires the multimedia contents by controlling frame of the photo or the motion picture, exposure of the multimedia apparatus, a focus, a white balance, flash light, a volume, or the like. However, if the user uses the guideline, since the user knows the characteristic of the contents and the context for the user to want to, the exposure, the focus, the white balance, or the like of the multimedia apparatus are automatically adjusted through the setting module 132 to obtain the optimal contents. It is possible to reduce inconvenience of when the user sets the state of the apparatus according to the corresponding situation.

Figure 8:
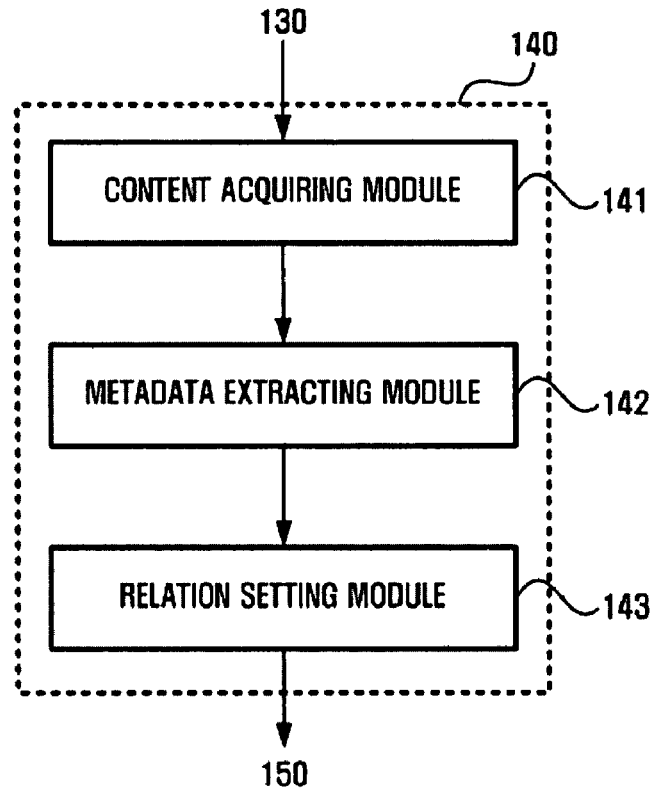
FIG. 8 is a block diagram illustrating a structure of a context processing module in an apparatus shown in FIG. 1.

FIG. 8 is a block diagram illustrating a structure of a context processing module 140 in an apparatus 100 shown in FIG. 1.

The context processing module 140 includes a content acquiring module 141 that receives contents which the user acquires from the guideline, a metadata extracting module 142 that extracts metadata from the contents, and an association setting module 143 that associates the contents with one another on the basis of the metadata.

The content acquiring module 141 acquires the contents on the guideline and the metadata.

As an amount of contents acquired by the user is increased, a content managing system is required.

Generally, the users collectively manage contents associated with one another when managing contents they acquire.

For example, the case of the images or photos captured in a specific place, such a wedding hall, the contents are associated with one another according to the place, and the contents are managed. In the case of the images or photos captured in the situation where a meeting is regularly held at a specific time, the contents are associated with one another according to a specific time and the contents are managed.

However, when the contents acquired from the multimedia apparatus become large quantities, the user need to confirm the contents and classify the contents according to the specific place and time. Sometime, when seeing the contents, the user may not know where, when, and why the contents are acquired.

To do so, the contents may be associated with one another through the metadata of the contents. However, it is not easy for the user to extract the metadata from a large amount of contents that have been already acquired.

However, when acquiring the contents by using the guideline according to an exemplary embodiment, a lot of metadata, such as a place, a time, or the theme, is included in the guideline. The contents acquired by using the guideline may be stored together with the contents acquired through the metadata extracting module 142 that extracts the metadata from the contents and thus may be effectively used in the content managing module 160 of the external apparatus.

For example, the photos that are captured at the same place may have higher association than the photos captured at the different places. Further, the photos that are captured in the same time zone may have higher association than the photos captured in the different time zones.

Further, the contents that use the same element among a plurality of elements in the above-described template, for example, the same background music or the same layout may have high association with one another.

In order to associate the contents with one another, the relation setting module 143 creates the metadata of the respective contents such that the user can easily manage a large quantity of contents.

Figure 9:
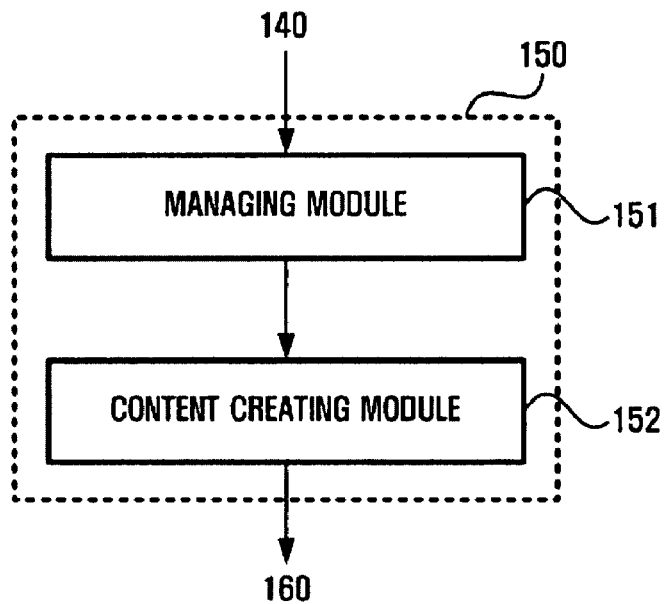
FIG. 9 is a block diagram illustrating a structure of a context creating module in an apparatus shown in FIG. 1.

FIG. 9 is a block diagram illustrating a structure of a context creating module 150 in an apparatus 100 shown in FIG. 1.

The context creating module 150 includes a managing module 151 that stores the contents which the user acquires from the guideline and the metadata of the contents according to association, and a content creating module 152 that creates a photo album having a form of a motion picture or contents having a form of a multimedia message.

The managing module 151 stores the contents acquired from the context processing module 140 and the metadata of the corresponding contents according to association. When the contents are downloaded through the external apparatus, the managing module 151 causes the contents and the metadata to be downloaded and used in the content managing module 160 of the external apparatus.

Further, the content creating module 152 is included in the external apparatus and automatically creates the contents as a photo album of a form of the motion picture or a multimedia message according to an object.

At this time, the guideline information is applied together, which creates contents where a story line is alive.

The multimedia apparatus can download the story template shown in FIG. 2 and the guideline according to the selection of the user, which shows a portion where the contents enter into a story template to be subsequently created. Accordingly, the contents can be captured, and the photo album can be created in the device.

For reference, the guideline only provides the guide, and the user determines or decisions whether the contents are acquired according to the guideline or not.

Further, various contents can be acquired for each story item and can be acquired in a media format that is not provided by the guideline.

For reference, the content managing module 160 may include a storing place (not shown) that stores the contents and the metadata and a content creating module (not shown), similar to the above-described content crating module 150.

Figure 10:
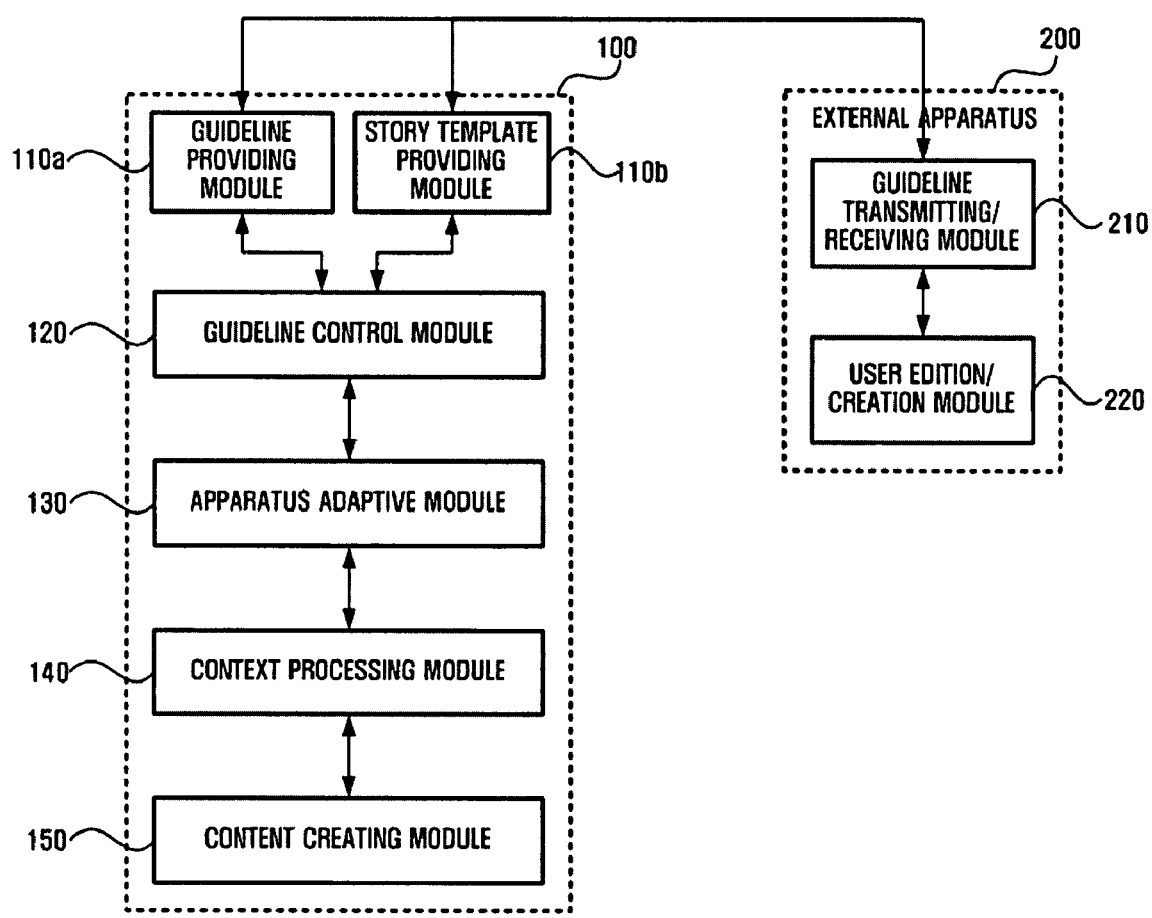
FIG. 10 is a block diagram illustrating a structure in which an apparatus shown in FIG. 1 shares a guideline with an external apparatus.

FIG. 10 is a block diagram illustrating a structure in which an apparatus 100 shown in FIG. 1 shares a guideline with an external apparatus 200 according to an exemplary embodiment.

The general user can easily acquire contents by applying a specialist knowledge-based guideline provided by the apparatus 100 shown in FIG. 1. However, it is possible to receive a guideline and a story template of another person stored in an external apparatus through the guideline transmitting/receiving module 210 shown in FIG. 10.

In addition, using the user edition/creation module 220, the user can edit the guideline and the story template according to an object and a taste of a user.

Further, the users can share a guideline and a story template to be newly created through the user edition/creation module 220 according to an object and a taste of each user with each by using the guideline transmitting/receiving module 210.

Accordingly, the users can easily share and change guidelines and story templates of various types.

For reference, the guideline transmitting/receiving module 210 and the user edition/creation module 220 shown in FIG. 10 may be included in the apparatus 100 shown in FIG. 1, may be constructed as separate external apparatus, or may be included in the external apparatus.

Figure 11:
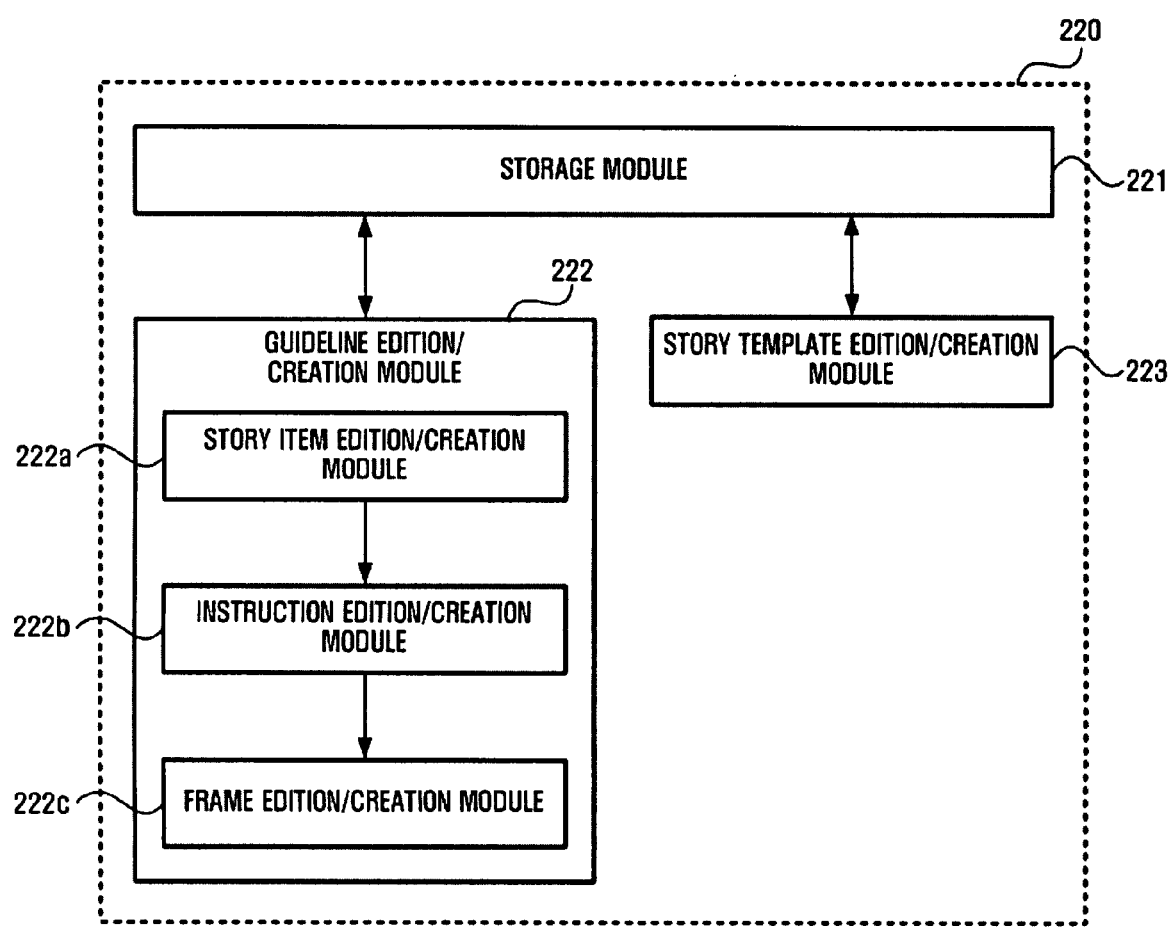
FIG. 11 is a block diagram illustrating a structure of a user edition/creation module in an external apparatus shown in FIG. 10.

FIG. 11 is a block diagram illustrating a structure of a user edition/creation module 220 in an external apparatus shown in FIG. 10.

The storage module 221 may store a guideline and a story template of another person acquired through the guideline transmitting/receiving module 210, or store a guideline and a story template newly edited or created by the user edition/creation module 220 according to an object and a taste of each user. The guidelines and the story templates that are stored through the above-described processes may be transmitted to the external apparatus through the guideline transmitting/receiving module 210 to be shared with other people.

The guideline edition/creation module 222 includes a story item edition/creation module 222a that edits or creates contents of a story item constituting a guideline, an instruction edition/creation module 222b that edits or creates instruction contents facilitating the understanding of the user according to the edited or created story item, and a frame edition/creation module 222c that edits or creates frame according to the edited or created story item.

When a new story item is deleted in the story item edition/creation module 222a, the instruction and the frame that correspond to the story item can also be deleted.

Further, when the new story item is created or the existing story item is edited, the guideline may be edited or created by editing or creating the instruction contents or frame.

The story template edition/creation module 223 may edit or create the story template to arrange the contents, such as the photos or the motion pictures, which are used in the photo album.

Figure 12:
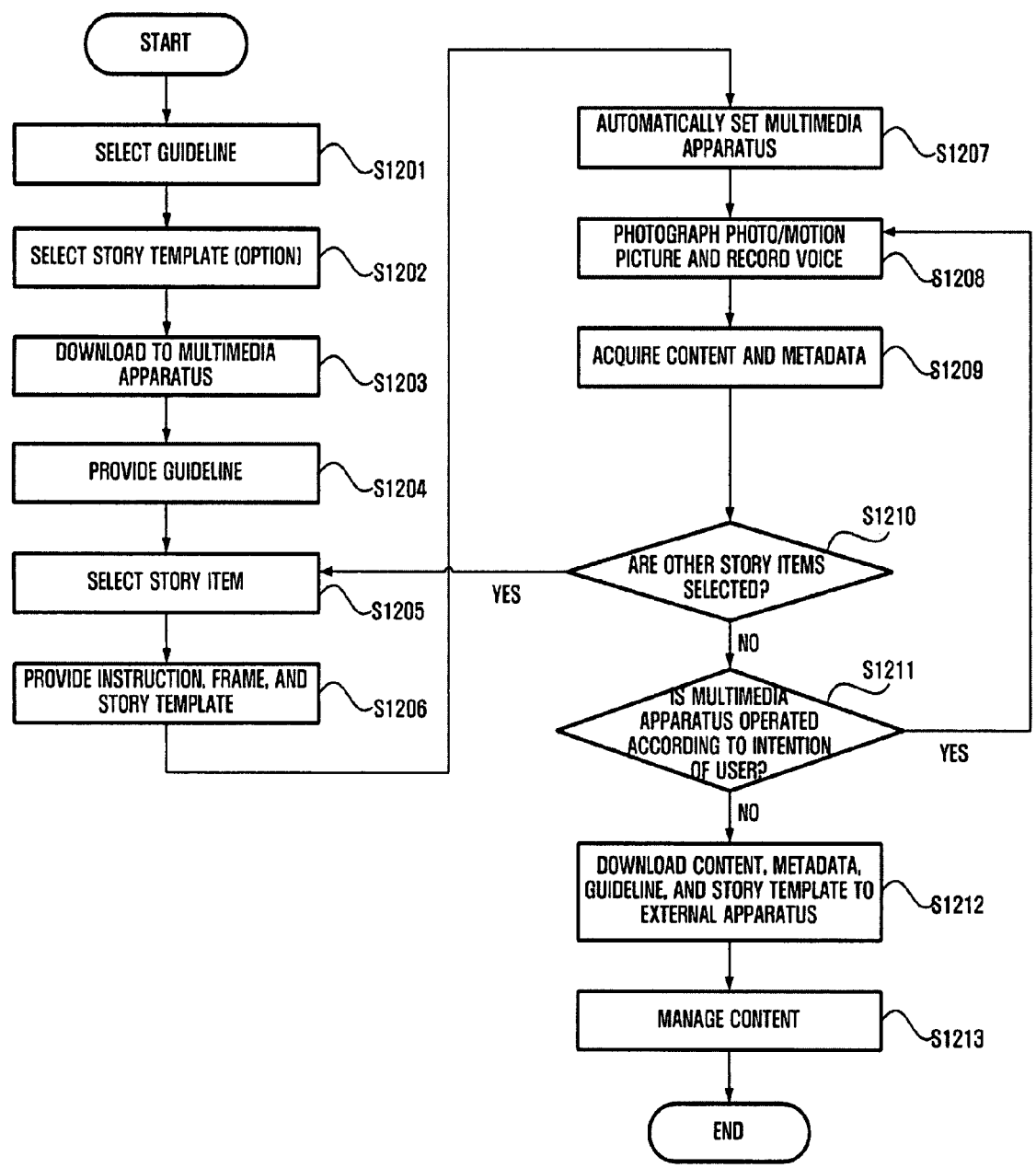
FIG. 12 is a flowchart illustrating a process of a method of providing and applying a specialist-based guideline in a multimedia apparatus according to an exemplary embodiment.

FIG. 12 is a flowchart illustrating a process of a method of providing and applying a guide line for arranging images with a story according to an exemplary embodiment. At this time, it is assumed that the guideline and the story template are stored in an external storing place, not inside the multimedia apparatus.

Hereinafter, the description will be made with reference to the apparatus shown in FIG. 1.

The user selects a guideline according to a photographic theme (theme) that is stored in an external storing place (Operation S1201).

After Operation S1201, a story template corresponding to the guideline is selected (Operation S1202).

At this time, the use of the story template is selected by the user, and after Operation S1202, the guideline and the story template are downloaded to the multimedia apparatus (Operation S1203).

After Operation S1203, the guideline control module 120 is supplied with the downloaded guideline and story template from the guideline providing module 110a and provides them to the user (Operation S1204).

After Operation S1204, the user selects the story item of the guideline (S1205), and the guideline control module 120 provides the capturing instruction, the capturing frame, and the story template corresponding to the story item to the user (Operation S1206).

After Operation S1206, when the user wants to select the story item and acquire the contents according to the guideline, the apparatus adaptive module 130 automatically sets the multimedia apparatus according to the situation of the contents to be acquired (Operation S1207).

After Operation S1207, when the photo or motion picture is captured or the voice is recorded (Operation S1208), the context processing module 140 acquires the contents and metadata (Operation S1209).

After Operation S1209, the user determines whether to select a subsequent story item (Operation S1210), or to operate the multimedia apparatus according to the intention of the user without depending on the guideline (Operation S1211).

In Operation S1211, the multimedia apparatus provides the user with a message inquiring the user about whether the user selects the subsequent story item or whether the user does not use the guideline, thereby enable the user to select whether or not to user the guideline.

After Operation S1211, the user transmits the contents, the metadata guideline, and the story template in the multimedia apparatus to the external apparatus (Operation S1212), and manages the contents (Operation S1213).

Figure 13:
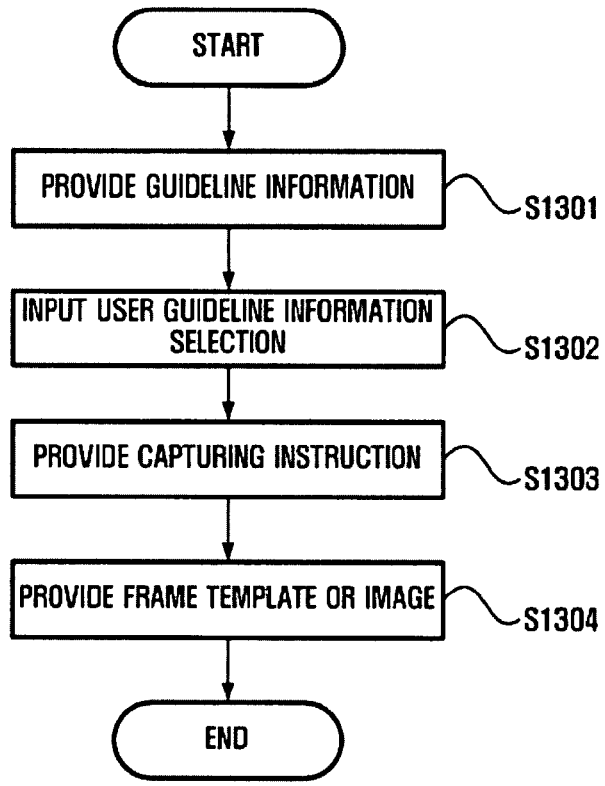
FIG. 13 is a flowchart illustrating a process flow of a guideline control module in an apparatus shown in FIG. 1.

FIG. 13 is a flowchart illustrating a process flow of a guideline control module 120 in an apparatus 10 shown in FIG. 1.

If the guideline providing module 110a provides the guideline information (Operation S1301) and the guideline selection input module 121 receives the selection of the user on the guideline information (Operation S1302), the instruction providing module 122 provides a capturing instruction for the story item of the selected guideline (Operation S1303).

After Operation S1303, the frame information providing module 123 provides the frame information including the frame template or the image in order to make the user easily understand the corresponding instruction (Operation S1304).

Figure 14:
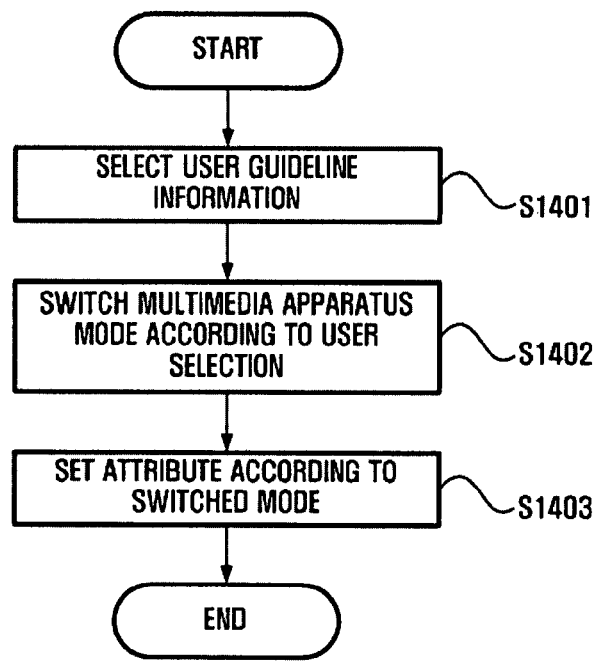
FIG. 14 is a flowchart illustrating a process flow of an apparatus adaptive module in an apparatus shown in FIG. 1.

FIG. 14 is a flowchart illustrating a process flow of an apparatus adaptive module 130 in an apparatus 100 shown in FIG. 1.

If the user selects the guideline (Operation S1401), the mode switching module 131 switches the mode of the multimedia apparatus according to the situation of the guideline selected by the user (Operation S1402).

After Operation S1402, the attribute setting module 132 sets the attribute of the multimedia apparatus according to the selected guideline and the switched mode (Operation S1403).

Figure 15:
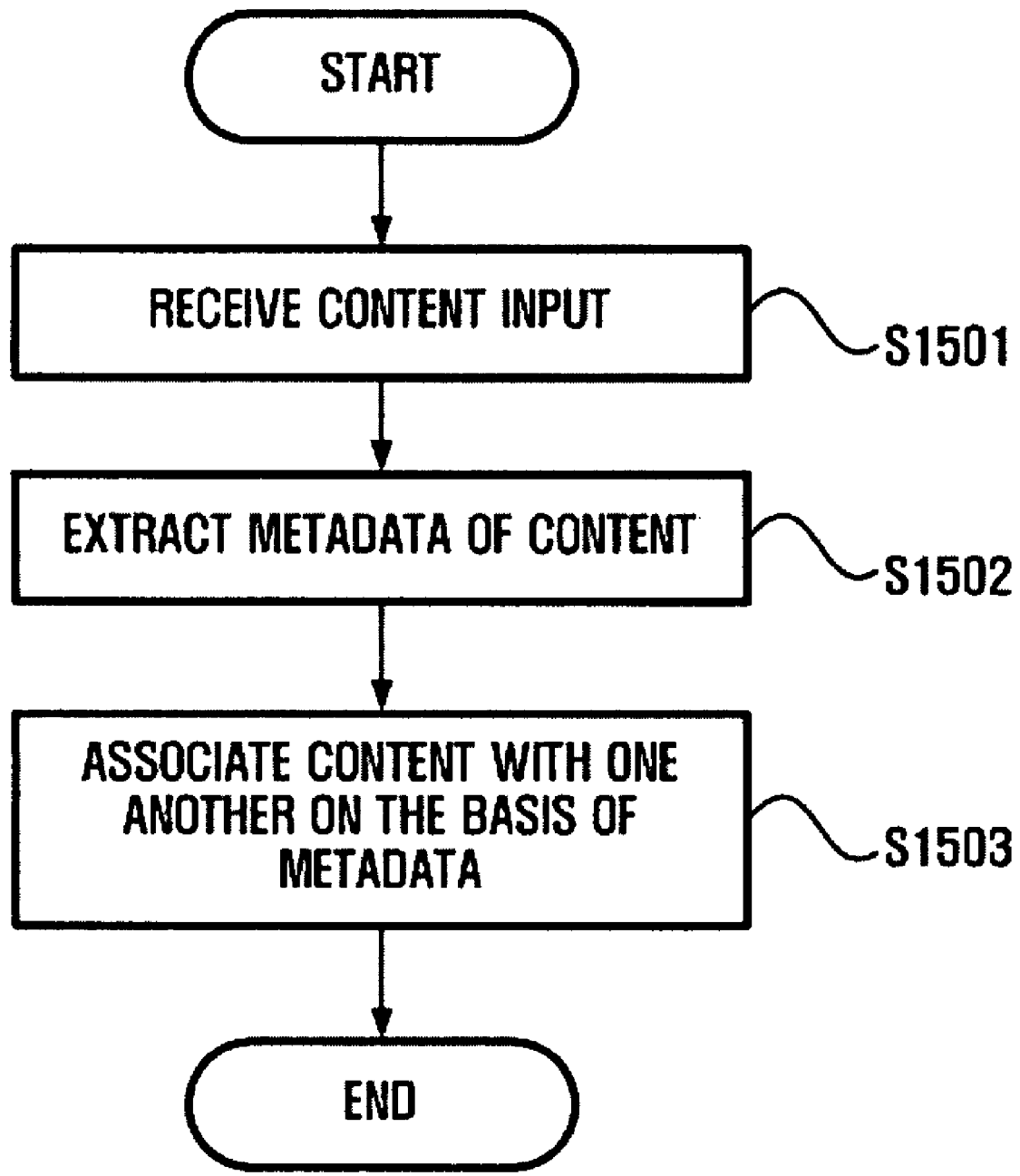
FIG. 15 is a flowchart illustrating a process flow of a context processing module in an apparatus shown in FIG. 1.

FIG. 15 is a flowchart illustrating a process flow of a context processing module 140 in an apparatus 100 shown in FIG. 1.

The content acquiring module 141 receives the contents which the user acquires through the guideline (Operation S1501).

After Operation S1501, the metadata extracting module 142 extracts the metadata like the place, the time, and the theme from the contents (Operation S1502).

After Operation S1502, the relation setting module 143 associates the corresponding contents with one another on the basis of the metadata such that the large quantities of contents are effectively used (Operation S1503).

Figure 16:
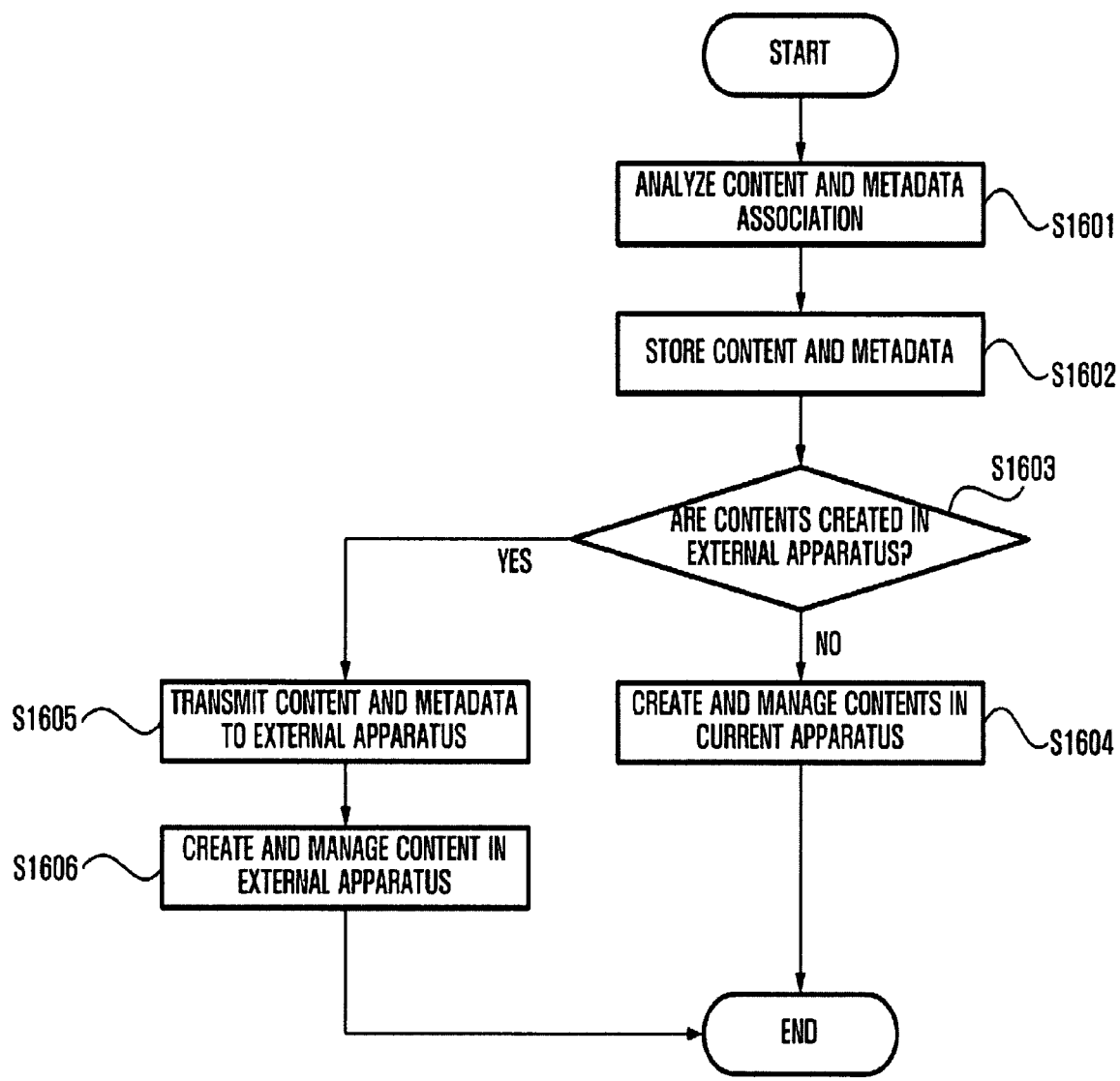
FIG. 16 is a flowchart illustrating a process flow of a context creating module in an apparatus shown in FIG. 1.

FIG. 16 is a flowchart illustrating a process flow of a context creating module 150 in an apparatus 100 shown in FIG. 1.

The managing module 151 analyzes the association between the contents which the user acquires through the guideline and the metadata of the contents (Operation S1601).

After Operation S1601, the managing module 151 stores the contents in the predetermined storing place according to the association between the contents and the metadata of the contents (Operation S1602).

After Operation S1602, the user transmits the contents and the corresponding metadata to the external apparatus, and determines whether a photo album having a form of a motion picture or contents having a form of a message service are created in the external apparatus or the contents are created in the current apparatus (Operation S1603).

If the contents are created in the current apparatus, the content creating module 152 creates a photo album having a form of a motion picture or contents having a form of a multimedia message (Operation S1604).

After Operation S1603, if the contents are created in the external apparatus, the contents stored in Operation S1602 and the metadata thereof are transmitted to the external apparatus (Operation S1605), and a photo album having a form of a motion picture or contents having a form of a multimedia message are created by the content managing module 160 of the external apparatus (Operation S1606).

Figure 17:
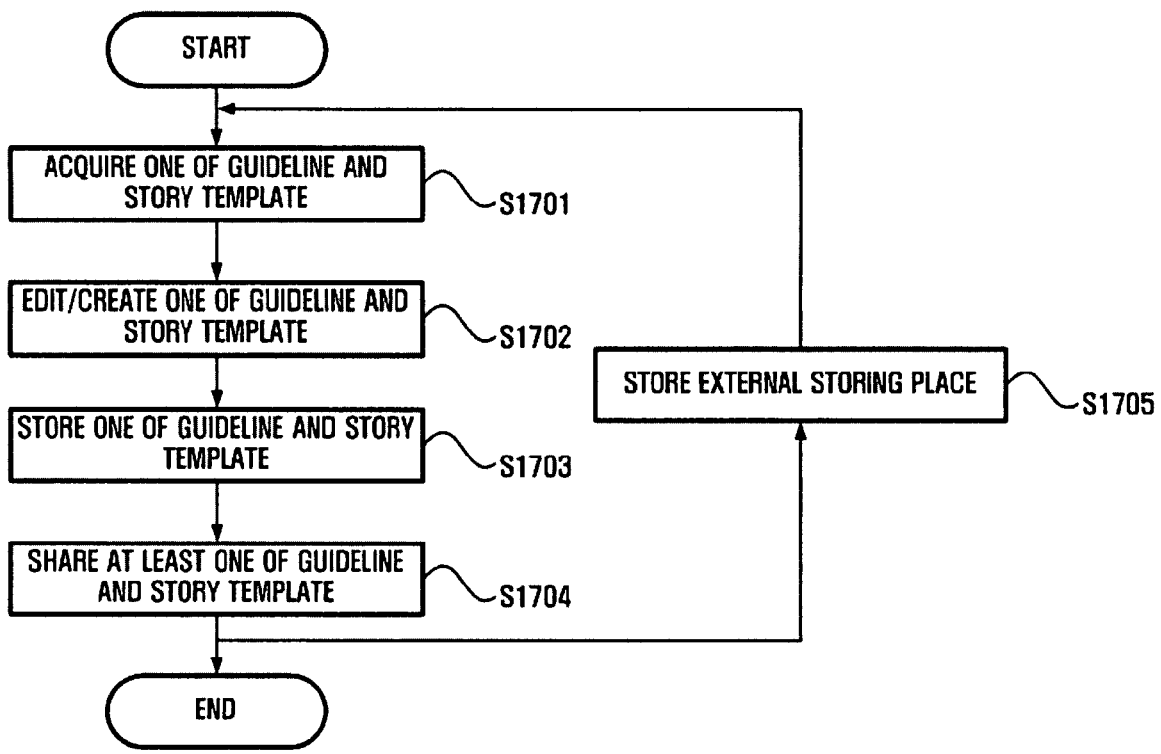
FIG. 17 is a flowchart illustrating a process in which an apparatus shown in FIG. 1 shares a guideline with an external apparatus.

FIG. 17 is a flowchart illustrating a process in which an apparatus shown in FIG. 1 shares a guideline with an external apparatus 200 according to an exemplary embodiment.

First, the user accesses the external apparatus through the guideline transmitting/receiving module 21 of the external apparatus shown in FIG. 10 and acquires one of the guideline and the story template that have been previously stored (operation S1701).

If the user does not edit one of the guideline and the story template having been already stored but newly edit the guideline and the story template, Operation S1701 may be omitted.

After Operation S1701, one of the acquired guideline and the story template is edited in the user edition/creation module 220 according to the object and taste of the user.

At this time, the user edition/creation module 220 may create one of a new guideline and a new story template according to the object and taste of the user or edit one of the existing guideline and story template (Operation S1702).

After Operation S1702, the user edition/creation module 220 stores one of the edited or created guideline and story template (Operation S1703).

After Operation S1703, the guideline transmitting/receiving module 210 transmits one of the stored guideline and story template to the external apparatus so as to share the guideline and the story template with another person (Operation S1705).

Figure 18:
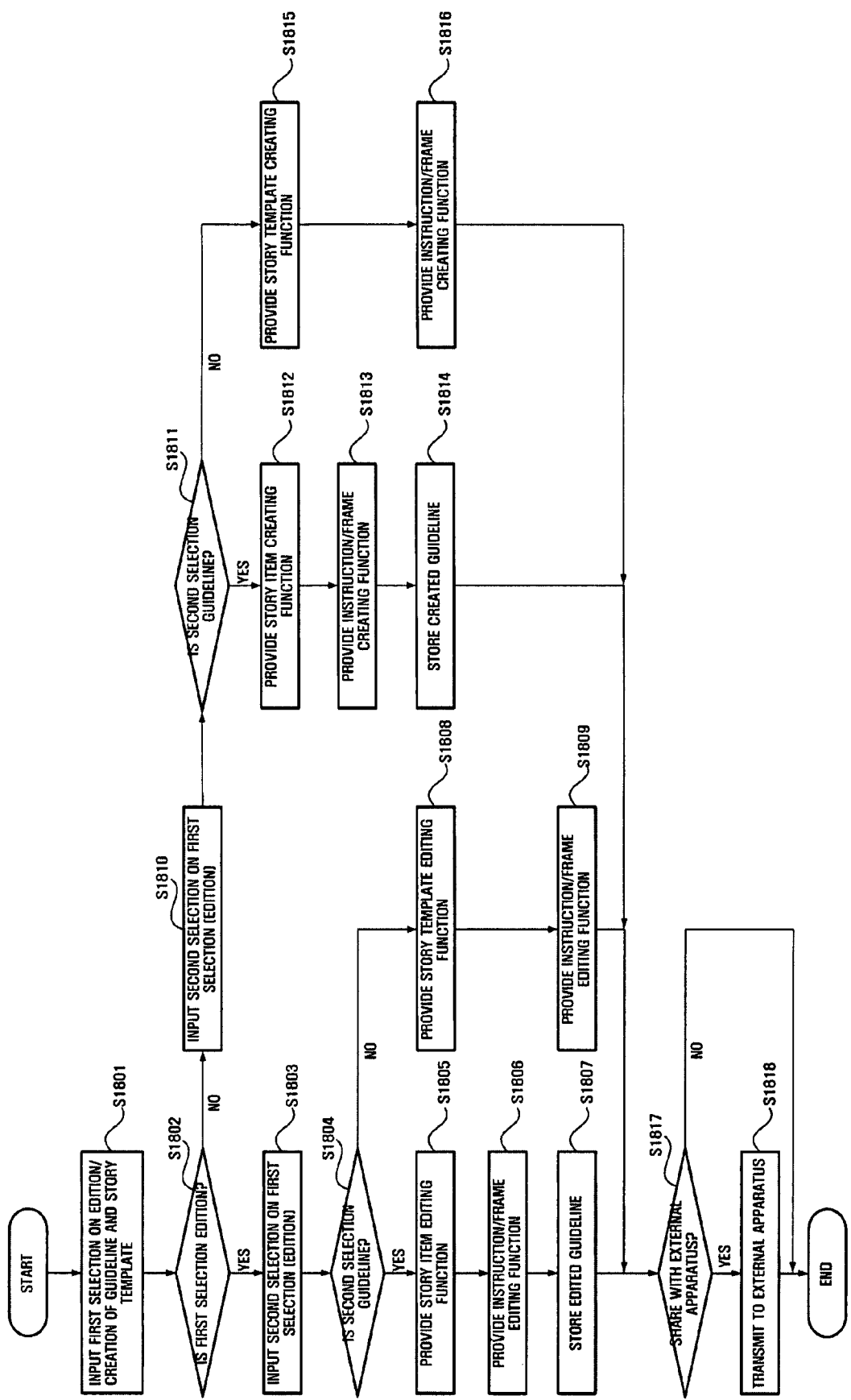
FIG. 18 is a flowchart illustrating a process flow of a user edition/creation module in an external apparatus shown in FIG. 10.

FIG. 18 is a flowchart illustrating a process flow of a user edition/creation module 220 in an external apparatus 200 shown in FIG. 10.

First, from the user, the user edition/creation module 220 receives a first selection on whether to edit one of the guideline and the story template already existing or acquired through the guideline transmitting/receiving module 210, or to create one of a new guideline and a new story template according to the object and taste of the user (Operation S1801).

After Operation S1801, the user edition/creation module 220 determines whether the first selection received from the user corresponds to the edition or creation of the guideline and the story template (Operation S1802).

As the result of determination, if the first selection corresponds to the edition of the guide line and the story template, the user edition/creation module 220 receives a second selection on whether the edited target is the guideline or the story template (Operation S1803).

For reference, the first and second selections are not limited to an exemplary embodiment, and the order thereof may be changed.

That is, after performing selection on whether the edited or created target is the guideline or the story template, whether the selected target is edited or created may be selected.

After Operation S1803, the user edition/creation module 220 determines whether the second selection input from the user is the guideline or the story template (Operation S1804).

As the result of determination, when the second selection corresponds to the guideline, that is, when the guideline is edited, the user edition/creation module 220 activates the story item edition/creation module 222a and provides the story item editing function to the user, such that the user can edit the story item (Operation S1805).

After Operation S1805, the user edition/creation module 220 activates the instruction edition/creation module 222b and the frame edition/creation module 222c so as to edit the instruction and the frame according to the contents of the story item edited by the story item edition/creation module 22a, and provides the instruction editing function and the frame editing function (Operation S1806).

After Operation S1806, the edited guideline is stored by the storage module 221 (Operation S1807).

As the result of the process in Operation S1804, when the section selection related to the edition corresponds to the story template, that is, the user edits the story template, the user edition/creation module 220 activates the story template edition/creation module 223 so as to edit the template constituting the story template, and provides the story template editing function (Operation S1808).

After Operation S1808, the edited story template is stored by the storage module 221 (Operation S1809).

As the result of the process in Operation S1802, when the first selection corresponds to the creation of the guideline and the story template, the user edition/creation module 220 receives the second selection on whether the edited target corresponds to the guideline or the story template (Operation S1810).

After Operation S1810, the user edition/creation module 220 determines whether the second selection received from the user corresponds to the guideline and the story template (Operation S1811).

As the result of determination, when the second selection corresponds to the guideline, that is, the guideline is created, the user edition/creation module 220 activates the story item edition/creation module 222a so as to create the story item constituting the guideline, and provides the story item creating function to the user (Operation S1812).

After Operation S1812, the user edition/creation module 220 activates the instruction edition/creation module 222b and the frame edition/creation module 222c so as to create the instruction and the frame according to the contents of the story item created by the story item edition/creation module 222a, and provides the instruction creating function and the frame creating function (Operation S1813).

After Operation S1813, the created guideline is stored by the storage module 221 (Operation S1814).

As the result of the process in Operation S1811, when the section selection related to the creation corresponds to the story template, that is, the user creates the story template, the user edition/creation module 220 activates the story template edition/creation module 223 so as to edit the template constituting the story template, and provides the story template editing function (Operation S1815).

After Operation S1815, the created story template is stored by the storage module 221 (Operation S1816).

After any one of Operations S1807, S1809, S1814, and S1816, when the user desires to share the contents with the external apparatus (Operation S1817), at least one of the guideline and the story template stored by the storage module 221 may be transmitted to the external apparatus to be shared (Operation S1818).

In addition to the above-described exemplary embodiments, exemplary embodiments can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

For example, each block or each operation shown in the figures may indicate a portion of a module, a segment or a code including one or more executable instructions for performing a specific logical function (or functions. The functions described in the blocks or the operations may be generated out of order. For example, two blocks or operations continuously shown can be actually performed at the same time, or they can be performed sometimes in reverse order according to the corresponding functions.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. For example, storage/transmission media may include optical wires/lines, waveguides, and metallic wires/lines, etc. including a carrier wave transmitting signals specifying instructions, data structures, data files, etc. The medium/media may also be a distributed network, so that the computer readable code/instructions are stored/transferred and executed in a distributed fashion. The medium/media may also be the Internet. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module" or "unit", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of exemplary embodiments, or they may be of the kind well-known and available to those skilled in the art of computer hardware and/or computer software.

According to the method and medium for providing information of a digital device, and the apparatus thereof, the following effects can be achieved.

According to one effect, it is possible to update the state information of the digital device in real time.

According to another effect, it is possible to stably update the state information of the digital device.

Although a few exemplary embodiments have been shown and described, it would be appreciated by those skilled in the art that changes may be made in these exemplary embodiments without departing from the principles and spirit of embodiments, the scope of which is defined in the claims and their equivalents.

What is claimed is:

1. An apparatus for providing a guideline for arranging images with a story, the apparatus comprising:
   a guideline control module to control guideline selected by a user according to a user's input or a content acquisition;

an apparatus adaptive module to automatically set a state of the apparatus for providing the guideline according to the guideline selected by the user; and a context processing module to acquire contents associated with the selected guideline, wherein the guideline control module further comprises:

a guideline selection input module to provide guideline information and to receive a selection of the user;

an instruction providing module to provide an instruction to allow the user to easily understand the selected guideline; and a frame information proving module to provide information including a frame to allow the user to easily understand the instruction, and wherein the context processing module further comprises:

a metadata extracting module to extract metadata from the contents; and a relation setting module to associate the contents with one another on the basis of the metadata.

2. The apparatus of claim 1, further comprising:
a content creator module to create associated contents on the basis of metadata of the contents.

3. The apparatus of claim 1, wherein the guideline comprises story items that are arranged with a story.

4. The apparatus of claim 3, wherein the story items comprises events or themes that are constructed on the basis of knowledge of a specialist.

5. The apparatus of claim 3, wherein the story items are based on scenes from which the user acquires contents.

6. The apparatus of claim 3, wherein the user selects the story items regardless of an order of the story items in the guideline.

7. The apparatus of claim 1, further comprising:
a story template providing module to provide a story template that is a format for arranging contents on the basis of the guideline.

8. The apparatus of claim 7, wherein the story template is provided together with the guideline according to the selection of the user.

9. The apparatus of claim 1, wherein the context processing module further comprises
a content acquiring module to receive contents acquired by the user through guideline.

10. An apparatus for providing a guideline for arranging images with a story, the apparatus comprising:
a guideline selection input module to provide guideline information and to receive a selection of a user;
an instruction providing module to provide an instruction to allow the user to easily understand the selected guideline;
a frame information proving module to provide information including a frame to allow the user to easily understand the instruction; and
a context processing module, the context processing module comprising:
a metadata extracting module to extract metadata from contents; and
a relation setting module to associate the contents with one another on the basis of the metadata,
wherein the guideline selection input module provides media formats of contents acquired from the selected guideline.

11. The apparatus of claim 10, wherein the information including the frame includes a frame template that overlaps a captured target and is provided to the user and an image that is captured through the instruction.

12. The apparatus of claim 11, wherein the user selects one of the frame template and the image in the information including the frame.

13. An apparatus for providing a guideline for arranging images with a story, the apparatus comprising:
a guideline control module to control guideline selected by a user according to a user's input or a content acquisition;
an apparatus adaptive module to automatically set a state of the apparatus for providing the guideline according to the guideline selected by the user;
a context processing module to acquire contents associated with the selected guideline,
wherein the guideline control module further comprises:
a guideline selection input module to provide guideline information and to receive a selection of the user,
an instruction providing module to provide an instruction to allow the user to easily understand the selected guideline, and
a frame information proving module to provide information including a frame to allow the user to easily understand the instruction; and
a content creating module, the content creating module comprising:
a managing module to store contents according to association between contents the user acquires through guideline and metadata of the contents; and
a content creating module to create a photo album having a form of a motion picture and contents having a form of a multimedia message on the basis of the contents and the metadata of the contents.

14. The apparatus of claim 13, wherein the content creating module converts a format of the created contents such that a user views the contents in a multimedia apparatus or an external apparatus.

15. A method of providing a guideline for arranging images with a story, the method comprising:
controlling guideline selected by a user according to a user's input or a content acquisition;
automatically setting a state of an apparatus for providing guideline according to the guideline selected by the user;
acquiring contents relative to the guideline,
wherein controlling guideline further comprises:
providing guideline information and receiving a selection of guideline from the user,
providing an instruction on the selected guideline, and
providing information including a frame to allow the user to easily understand the instruction; and
context processing, wherein context processing comprises:
extracting metadata from the contents, and
associating the contents with one another on the basis of the metadata.

16. The method of claim 15, further comprising:
creating associated contents on the basis of metadata of the contents.

17. The method of claim 16, wherein the guideline comprises story items that are arranged with a story.

18. The method of claim 17, wherein the story items comprises events or themes that are constructed on the basis of knowledge of a specialist.

19. The method of claim 17, wherein the story items are based on scenes from which the user acquires contents.

20. The method of claim 17, wherein the user selects the story items regardless of an order of the story items in the guideline.

21. The method of claim 15, further comprising:
providing a story template that is a format for arranging contents on the basis of the guideline.

22. The method of claim 21, wherein the story template is provided together with the guideline according to the selection of the user.

23. The method of claim 15, wherein the context processing further comprises
receiving contents acquired by the user through guideline.

24. At least one non-transitory computer readable medium storing computer readable instructions that control at least one processor to implement the method of claim 15.

25. A method of providing a guideline for arranging images with a story, the method comprising:
providing guideline information and receiving a selection of guideline from a user;
providing an instruction on the selected guideline;
providing information including a frame to allow the user to easily understand the instruction; and
context processing, the context processing comprises:
extracting metadata from contents, and
associating the contents with one another on the basis of the metadata,
wherein, in the receiving of the selection of the user, media formats of contents are acquired from the selected guideline is provided.

26. The method of claim 25, wherein the information including the frame includes a frame template that overlaps a captured target and is provided to the user and an image that is captured through the instruction.

27. The method of claim 26, wherein the user selects one of the frame template and the image in the information including the frame.

28. At least one non-transitory computer readable medium storing computer readable instructions that control at least one processor to implement the method of claim 25.

29. A method of providing a guideline for arranging images with a story, the method comprising:
controlling guideline selected by a user according to a user's input or a content acquisition;
automatically setting a state of an apparatus for providing guideline according to the guideline selected by the user;
acquiring contents relative to the guideline,
wherein controlling guideline further comprises:
providing guideline information and receiving a selection of guideline from the user,
providing an instruction on the selected guideline, and
providing information including a frame to allow the user to easily understand the instruction; and
creating content, wherein creating content comprises:
storing contents according to association between contents acquired by the user through guideline and metadata of the contents; and
creating a photo album having a form of a motion picture and contents having a form of a multimedia message on the basis of the contents and the metadata of the contents.

30. The method of claim 29, wherein, in the creating of the contents, a format of the created contents is converted such that a user views the contents in a multimedia apparatus or an external apparatus.

31. At least one non-transitory computer readable medium storing computer readable instructions that control at least one processor to implement the method of claim 29.

* * * * *